United States Patent [19]

Kleine

[11] Patent Number: 4,819,989
[45] Date of Patent: Apr. 11, 1989

[54] PROPULSION SYSTEMS FOR MINERAL MINING MACHINES

[75] Inventor: Herbert Kleine, Lunen, Fed. Rep. of Germany

[73] Assignee: Gewerkschaft Eisenhutte Westfalia GmbH, Fed. Rep. of Germany

[21] Appl. No.: 67,692

[22] Filed: Jun. 29, 1987

[30] Foreign Application Priority Data

Jul. 2, 1986 [DE] Fed. Rep. of Germany ....... 3622110

[51] Int. Cl.⁴ .............................................. E21C 29/10
[52] U.S. Cl. ...................................... 299/43; 474/157
[58] Field of Search ............................. 299/32, 34, 43; 474/155, 157, 232, 233, 210, 212; 59/84; 198/606

[56] References Cited

U.S. PATENT DOCUMENTS 4,110,971  9/1978  Bruce ...................................... 59/84
4,372,619  2/1983  Braun .................................... 299/43

FOREIGN PATENT DOCUMENTS 2600536  7/1977  Fed. Rep. of Germany .
8204441  3/1982  France .

Primary Examiner—Stephen J. Novosad
Assistant Examiner—David J. Bagnell
Attorney, Agent, or Firm—Samuels, Gauthier, Stevens & Kehoe

[57] ABSTRACT

A reactive-track type propulsion system for a mineral winning machine comprises a sprocket chain located along the path of intended movement and a sprocket wheel with teeth meshing with the chain. The wheel is mounted on the machine and driven to propel the machine along the chain. The chain has horizontal oval links and vertical links which have planar end faces which make driving and rolling contact with the flanks of the teeth of the sprocket wheel.

9 Claims, 3 Drawing Sheets

PROPULSION SYSTEMS FOR MINERAL MINING MACHINES

BACKGROUND TO THE INVENTION

1. Field Of The Invention

The present invention relates in general to a mineral mining installation and, more particularly, to a propulsion system for a mineral winning machine which is moved back and forth along a mineral face.

2. Description Of Prior Art

Reactive-track type propulsion systems for moving a winning machine, usually a shearer, along a mineral face are known in which a toothed sprocket wheel on the machine is rotated and engages or meshes with a track fixed along the path of movement of the machine. The track is composed of sections mounted onto the pans of a scraper-chain conveyor. It is also known to employ a sprocket chain as the track. In known arrangements described, for example, in French Patent Specification No. 2 523 639 and in German Patent Specifications Nos. 2 600 536 and 2 938 408, the teeth of the drive wheel located in horizontal links of the chain while vertical links of the chain engage between the teeth so that the wheel rolls over these links and the reactive force propels the winning machine. The chain is located in a carrier or guide which traps the horizontal links but allows movement longitudinally of the chain. Normally, a guide tongue on the shearer engages beneath a flange or strip on the carrier to hold the machine down and prevent the drive wheel lifting clear of the chain. In another known propulsion system, described in U.S. Pat. No. 4,372,619, an oval link chain is used as the track and the vertical links of the chain are shorter than the horizontal links and provide minimal clearance for the horizontal links thereby restricting the tensional and contractional play in the chain and ensuring the correct pitch for the teeth of the drive wheel. The inherent articulation between the links permits the chain to flex however.

A disadvantage of the known systems is that even slight variations in the distance between the longitudinal axis of the chain and the rotational axis of the drive wheel create considerable transverse forces up to 15% to 20% of the propulsive force. During operation, the forces produced by the cutting drums of the shearer are considerable and often tend to lift the machine. This is resisted by the components of the hold-down means which slide relative to one another with high friction. The lifting of the machine however causes variation in the distance between the chain axis and the axis of the drive wheel and transverse forces are exerted on the teeth of the drive wheel to aggravate the situation and further increase the friction between the components of the hold-down means. Rapid wear of the components then results which reduces efficiency.

The use of a chain of the type described in U.S. Pat. No. 4,372,619 as the track for the drive wheel requires a relatively large pitch for the drive wheel teeth and to restrict the size of the drive wheel it is necessary to have the lowest possible number of teeth. This necessitates heavy undercutting of the roots of the teeth and this makes the wheel more liable to bend under stress. To preclude this, additional reinforcement is provided but this tends to modify the operative shape of the teeth and tooth contact occurs mostly above the longitudinal axis of the chain. This again creates lateral forces and the effects discussed above.

A general object of the present invention is to provide an improved propulsion system.

SUMMARY OF THE INVENTION

A propulsion system for a mineral mining machine constructed in accordance with the invention comprises, as is known, at least one rotatably driven sprocket wheel on the machine with teeth engaging with a chain having its longitudinal axis disposed along the path of movement of the machine. The chain is located in its operative position by carrying and guide means usually installed on a scraper-chain conveyor while hold-down means serves to hold the machine and the wheel down and maintain meshing engagement between the teeth of the wheel and the chain. In accordance with the invention, the chain is composed of first links oriented to lie in a plane parallel to the axis of rotation of the drive wheel and typically horizontally and second links oriented perpendicular to the rotational axis. The teeth of the drive wheel engage with the second links and make contact with these links on planar end faces thereof which are substantially perpendicular to the rotational axis.

A propulsion system constructed in accordance with the invention provides a more favourable engagement between the teeth of the drive wheel and the chain links leading to predominantly only normal reactive forces in the direction of the chain axis. This is so even with variations in the distance between the longitudinal axis of the chain and the rotation axis of the drive wheel which are unavoidable in practice. Hence, no appreciable transverse forces occur and the tendency of the components of the hold-down means to suffer rapid wear is mitigated.

The first links can be simple oval links of round or circular cross-section and of conventional design. The second links are usually however of more special design, smaller in length or pitch than the first links and with the planar end faces on which the flanks of the teeth of the drive wheel roll. The end faces usually stand vertically. The second links may each have a plate-like forged body with the end faces and a central elongate opening which receives the looped end regions of a pair of the first links. Alternatively, round or circular cross-section links may be adopted provided their outer arcuate faces are re-shaped by machining or upsetting to become planar. The distance between the planar end faces is considerably greater than the thickness of the first links.

The opening in each second link is preferably shaped at its ends to match the looped end regions of the first links received therein. The opening is restricted in width to just accommodate these end regions and the length of the opening is just slightly greater than the combined thickness or diameter of the end regions. It is also desirable for the planar end faces to terminate somewhat above the uppermost surface regions of the first links.

The planar end faces constitute hypocycloids of straight-flank toothing while the tooth flanks constitute corresponding epicycloids. The end faces which extend parallel to one another are described by an infinitely large rolling circle diameter. The flanks of the teeth and the end faces of the second links may have equal pitch circles and this pitch circle on account of the infinitely large rolling circle of the chain has an arc which becomes a straight line. The contour of the tooth flanks formed by this straight line is involuted.

The chain constructed as aforesaid can be anchored in the carrier in any convenient fashion. For example, the first links can be trapped in pockets or channels of the carrier or the second links can have flange-like bases acting as feet which are trapped in the carrier somewhat beneath the chain axis.

The invention may be understood more readily and various other aspects and features of the invention may become apparent from consideration of the following description.

BRIEF DESCRIPTION OF THE DRAWINGS

Embodiments of the invention will now be described, by way of examples only, with reference to the accompanying drawings, wherein.

DESCRIPTION OF PREFERRED EMBODIMENTS

Figure 1:
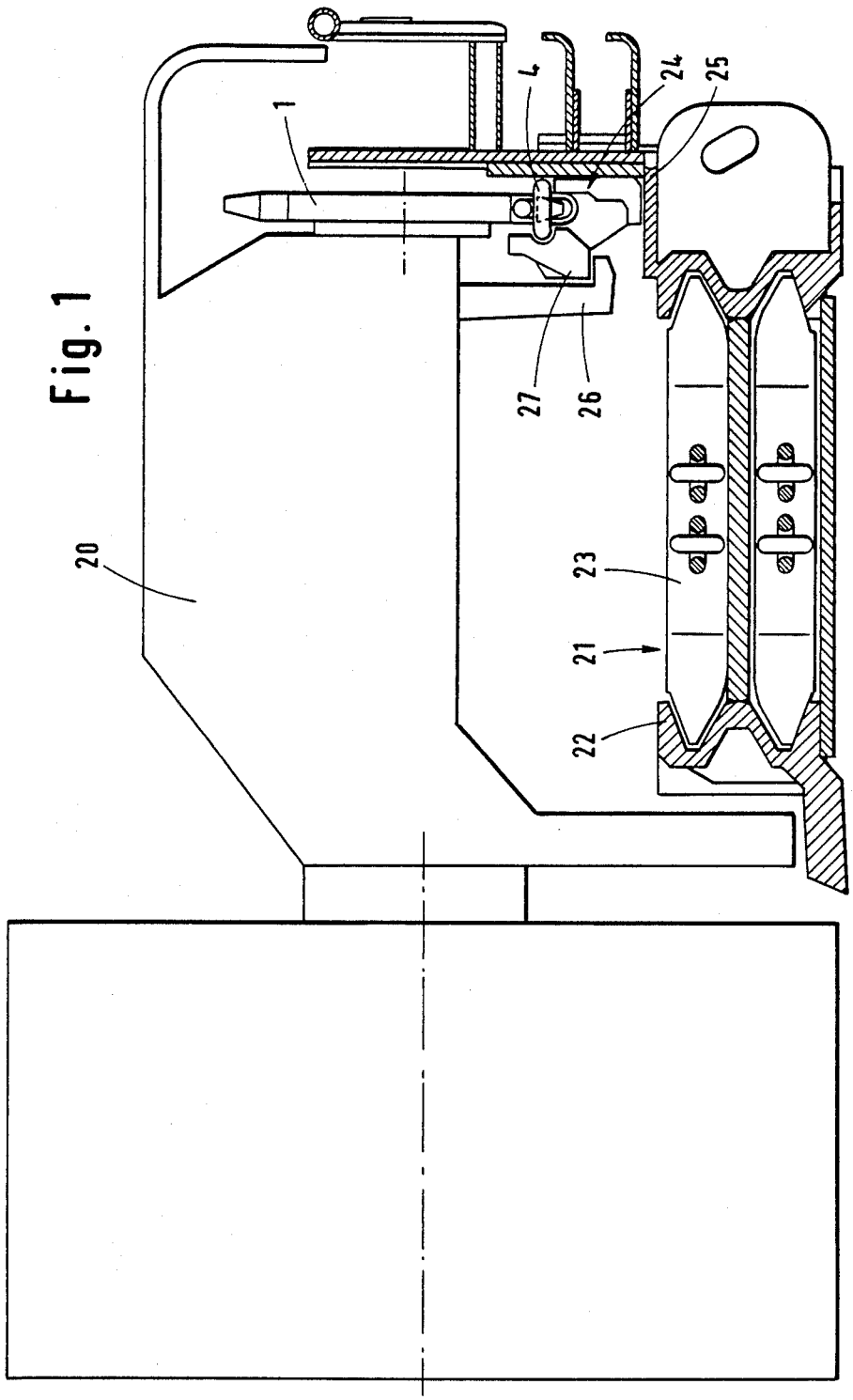
FIG. 1 is a part-sectional schematic end view of a mineral mining installation constructed in accordance with the invention.
Figure 2:
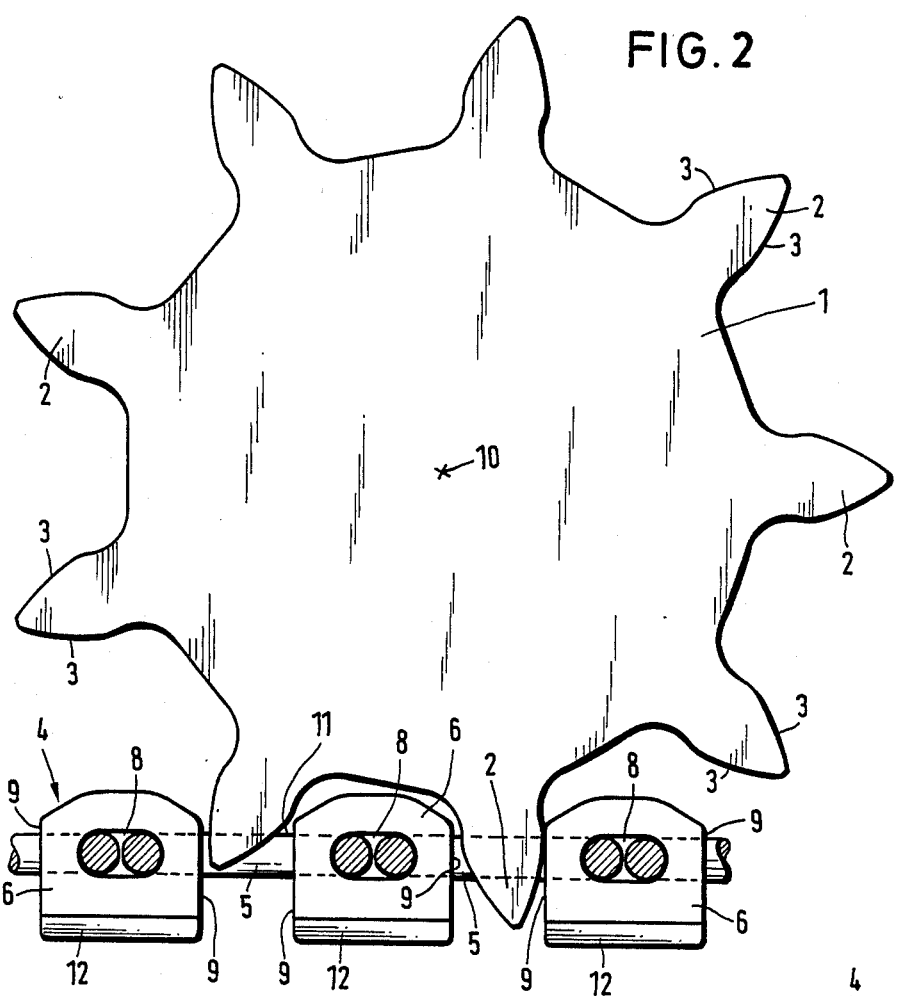
FIG. 2 is a part-sectional schematic side view of a drive wheel and part of an associated chain usable in the installation of FIG. 1.

As shown in FIG. 1, a mineral mining installation comprises a mineral winning machine in the form of a shearer 20 mounted on a scraper-chain conveyor 21 disposed alongside a mineral face (not shown). The conveyor 21 is constructed, as is shown, from a series of individual channel sections or pans 22 arranged end-to-end and a scraper-chain conveyor assembly 23 which is circulated along the pans 22 to transfer material detached from the mineral face by the shearer 20. The shearer 20 is moved back and forth along the conveyor 21 by a reactive-track haulage system disposed at the goaf side of the conveyor 21. This haulage system, known per se, is composed of a toothed sprocket wheel 1 rotatably mounted on the main body of the shearer 20 and engaging with a chain 4 fitted into a carrier and guide means 24. The carrier and guide means 24 is itself composed of sections mounted on a support structure 25 at the goaf side of the pans 22. The drive wheel 1 is driven by drive means of the shearer 20 to propel the shearer 20 along the chain 4 and the conveyor 21. A tongue or lug 26 depends from the shearer body to engage beneath a shoulder 27 of the guide and hold the sprocket wheel 1 down in constant meshing engagement with the chain 4.

Figures 3, 4:
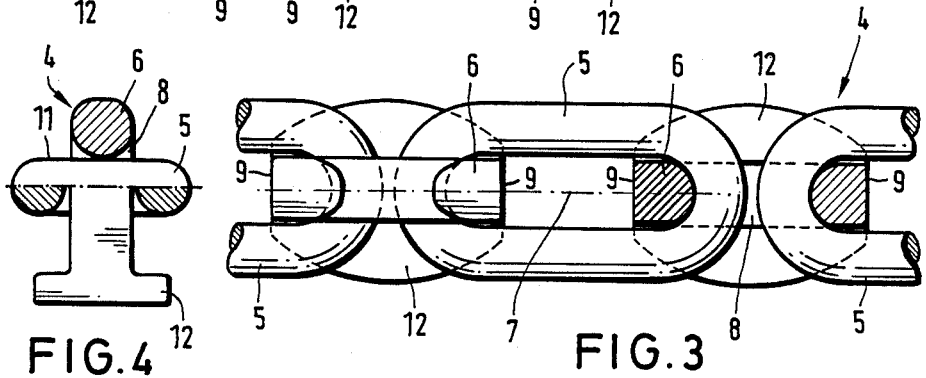
FIG. 3 is a part-sectional plan view of part of the chain depicted in FIG. 2.
FIG. 4 is a part-sectional end view of the chain shown in FIGS. 2 and 3.
Figure 5:
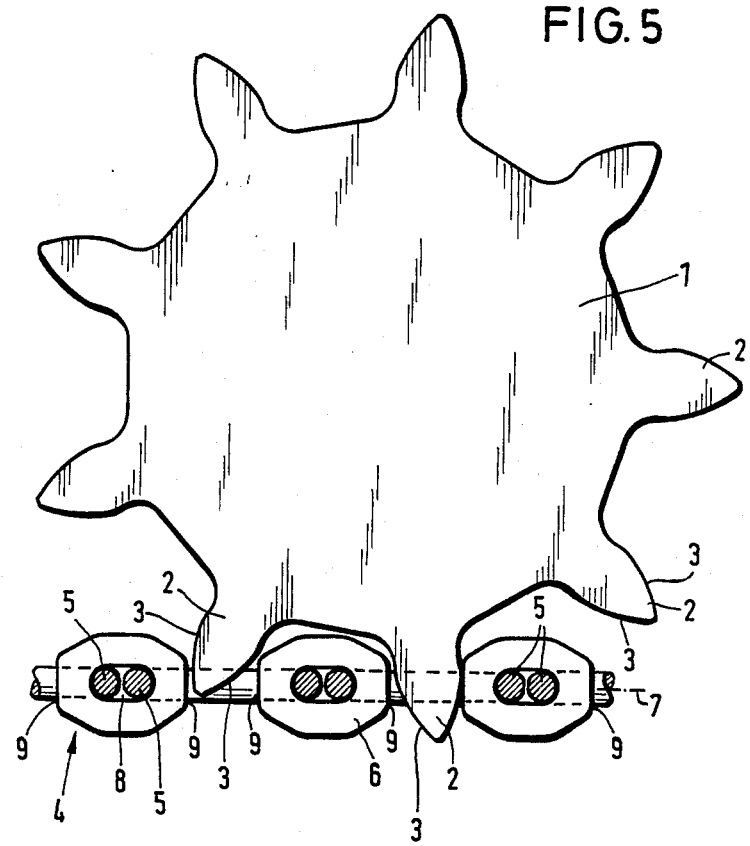
FIG. 5 is a part-sectional schematic side view of a drive wheel and part of an associated chain of modified design usable in the installation of FIG. 1.
Figures 6, 7:
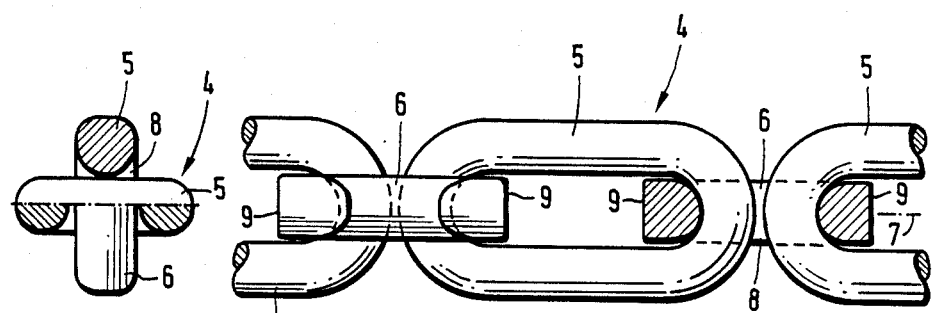
FIG. 6 is a part-sectional plan view of part of the chain depicted in FIG. 5.
FIG. 7 is a part-sectional end view of the chain shown in FIGS. 5 and 6.

FIGS. 2 to 4 and 5 to 7 depict constructional forms for the chain 4 and drive wheel 1 representing embodiments of the invention. As shown, in both versions, the drive wheel 1 has nine teeth 2 with cycloidal involute flanks 3. The associated chain 4 is composed of horizontal links 5 into which the teeth 2 are received and vertical links 6 which engage between the teeth 2. The links 5 are basically of conventional elongate oval shape constructed from round, i.e. circular cross-sectional material, while the links 6 are of special design. The links 6 are smaller in length along the longitudinal axis 7 of the chain 4 than the links 5. The links 6 each have a main generally rectangular upstanding body. In the embodiment shown in FIGS. 2 to 4, the main body of each link 6 merges with a flange-like base or foot portion 12. The sides of the base portion 12 are curved as shown in FIG. 3. The base portions 12 of the links 6 serve to locate the chain 4 in a channel (not shown) of the guide 24 and prevent the chain 4 from lifting out of the guide 24. In the simpler version shown in FIGS. 5 to 7, the links 6 do not have the base portions 12 and as shown in FIG. 1, one or both sides of the links 5 are simply held in a pocket of the guide 24. In both embodiments, the main body of each link 6 has an elongate opening 8 oriented in the direction of the longitudinal axis 7 of the chain 4. This opening 8 receives the looped end regions of a pair of adjacent horizontal links 5. The opening 8 has a length just slightly greater than twice the diameter of the links 5 with clearance just enough to permit the requisite articulation. The ends of the opening 8 are curved to match the curvature of the links 5 in lateral and vertical senses so that the links 5 are supported with large contact areas over their outer end regions. The vertical distance of the opening is also just sufficient to accommodate the links 5 with slight clearance. The main body of each link 6 has outer end faces 9 which co-operate with the flanks 3 of the teeth 2 and these faces 9 extend normal to the axis 7 and, during use, substantially vertically. The end faces 9 merge with a generally rounded upper face. The end faces 9 extend over a distance larger than the diameter of the links 5 and terminate at the upper ends above the uppermost apex plane 11 of the links 5. This ensures adequate rolling contact for the flanks 3 of the teeth 6 and this despite variation in the distance between the axis 7 of the chain 4 and the rotational axis 10 of the wheel 1 due to clearances and tolerances of manufacture. Typically, the variation can be up to 10mm and is determined primarily by the means 26, 27 holding down the wheel 1.

The flanks 3 of the teeth 2 roll over the faces 9 of the links 6 of the chain 4 in succession and subject the chain 4 to traction and compressive forces. Predominantly normal faces only act between the flanks 3 and the faces 9 of the links 6 in the direction of the axis 7 of the chain 4 to propel the machine and no transverse forces are created to any significant extent even if the aforementioned variation in the distance between the axis 7 and the axis 10 occurs. Frictional forces are minimized and undue wear is precluded.

I claim:

1. In a reactive-track propulsion system for a mineral mining machine comprising at least one sprocket wheel with teeth provided on the machine and driven to rotate about an axis; a chain with a longitudinal axis disposed along the path of movement of the machine; the sprocket wheel meshing with the chain to make driving engagement therewith; carrier and guide means for locating the chain and hold-down means for holding the machine down in relation to the carrier and guide means to maintain the meshing engagement between the sprocket wheel and the chain; the improvement comprising the chain is composed of first links oriented to lie in a plane predominantly parallel to the axis of rotation of the sprocket wheel and second links oriented to lie in a plane predominantly perpendicular to the axis of rotation of the sprocket wheel, the first links are of greater length relative to the longitudinal axis than the second links, the first and second links have openings therein for receiving looped end regions of adjacent links, with the openings in the second links having lengths measured in the direction of the longitudinal axis which are just slightly greater than twice the diameter of the looped end regions of the first links received therein, and the second links have end faces relative to the longitudinal axis of the chain which are parallel and planar and extend perpendicular to said longitudinal axis with flanks of the teeth of the sprocket wheel making drive contact with the end faces of the second links.

2. A system according to claim 1, wherein the first links are oval.

3. A system according to claim 1, wherein the first links are round in cross-section.

4. A system according to claim 1, wherein the first links are circular in cross-section.

5. A system according to claim 1, wherein the end faces of each of the second links extend over a distance perpendicular to the longitudinnal axis greater than the thickness of each of the first links taken perpendicularly to the longitudinal axis.

6. A system according to claim 1, wherein the end faces of each of the second links terminate nearest the sprocket wheel at a position above an apex plane containing the uppermost regions of the first links.

7. A system according to claim 1, wherein each second link has a main body containing an elongate central opening receiving end regions of a pair of adjacent first links and the opening has a length along the longitudinal axis of the chain just slightly greater than the corresponding dimension of the two received end regions of the first links and a width transverse to the longitudinal axis which is just slightly greater than the corresponding dimension of each one of the end regions.

8. A system according to claim 1, wherein each second link has a plate-like main body with the end faces and an opening receiving end regions of a pair of adjacent first links and a flange-like base portion extending perpendicular to the main body which is guided and retained by the carrier and guide means.

9. A system according to claim 1, wherein each second link is an oval link which is re-shaped to possess the planar end face.

* * * * *